May 7, 1957  H. G. CRISP  2,791,466
LAWN SPRINKLER WITH INTEGRAL COUPLING MEANS
Filed April 2, 1956

Harold G. Crisp
INVENTOR.

BY
*Attorneys*

2,791,466
LAWN SPRINKLER WITH INTEGRAL COUPLING MEANS

Harold G. Crisp, Corpus Christi, Tex.

Application April 2, 1956, Serial No. 575,394

2 Claims. (Cl. 299—75)

This invention relates to improvements in lawn sprinklers and particularly to a novel sprinkler which requires no screw threaded coupling to attach to the standard garden hose.

An object of the present invention is to provide an inexpensive yet superior lawn sprinkler which attaches to the standard garden hose nozzle rather than to the coupling of the garden hose as is customary at the present time. As a result, the sprinkler may be attached and taken off a standard water nozzle without removing the nozzle from the hose. The result is that the sprinkler may be attached more quickly and removed more quickly from the garden hose nozzle. It is a well appreciated difficulty to attach a garden sprinkler to a garden hose. An individual using a garden hose must go to the valve and turn the valve to the off position. Then the nozzle has to be removed from the garden hose and the sprinkler head attached. Unless this procedure is followed when removing the garden hose nozzle from the garden hose, the user becomes wet. Accordingly, by very deftly and quickly attaching the lawn sprinkler to the nozzle without having to bother with threaded couplings, the lawn sprinkler may be attached to a garden hose even while it is being used. Moreover, standard garden hose nozzles are capable of being closed. The garden hose nozzle may be turned to the closed position and then have the lawn sprinkler attachment applied to it. Then the nozzle valve may be opened. In either case, the attachment of the springler which constitutes an embodiment of the invention is much easier than in prior sprinklers.

Another and equally important object of the present invention is to provide a sprinkler for a garden hose which when pulled across the lawn will not cause as much damage to the lawn. The rounded shape of the sprinkler will not uproot grass when dragged over the lawn as so many lawn sprinklers that are commercially available at the present time do. Moreover, it is contemplated that a pliable plastic, for example a polyethylene will be used to further aid in the objects.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
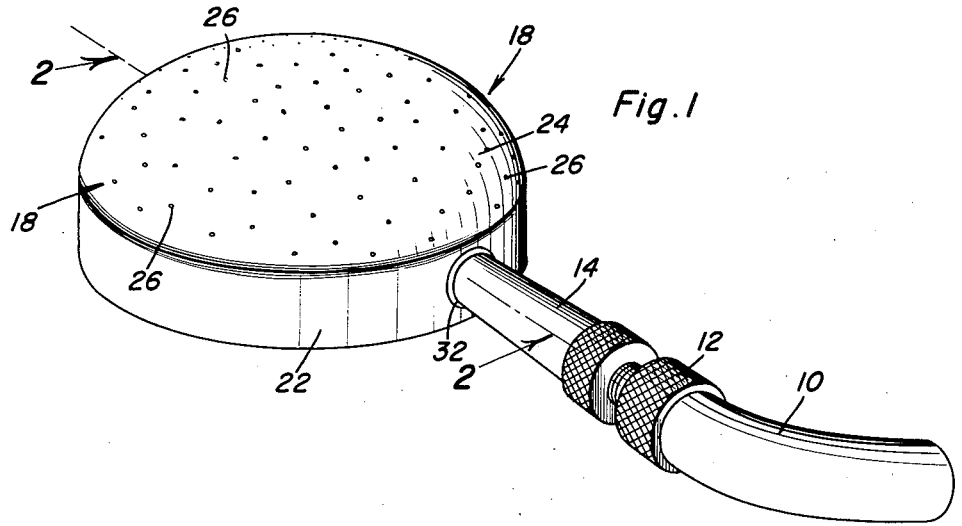
Figure 1 is a perspective view of a lawn sprinkler which exemplifies the principles of the invention in use.
Figure 2:
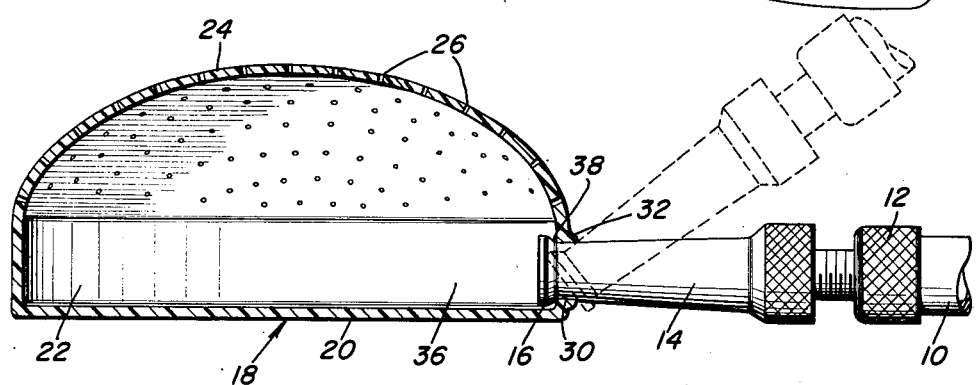
Figure 2 is a sectional view taken on the line 2—2 of Figure 1.
Figure 3:
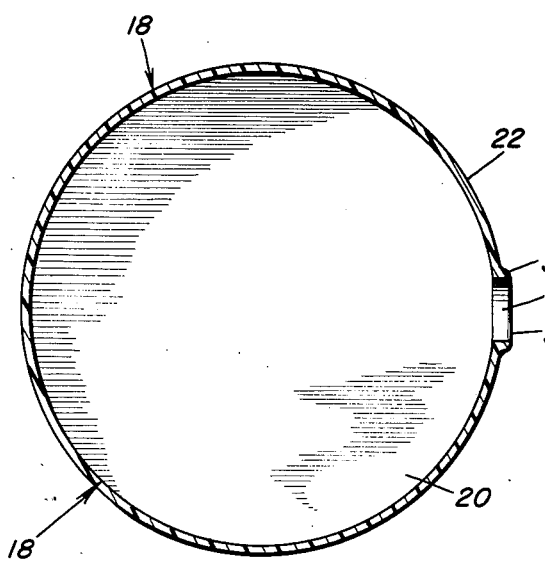
Figure 3 is a horizontal sectional view of the lawn sprinkler.

In Figures 1 and 2 there is a standard garden hose 10 having a coupling 12 at one end to which the standard garden hose nozzle 14 is attached. This nozzle is of the usual form, that is, it is capable of being rotated in order to vary the spray pattern that is issued therefrom.

Ordinarily such a garden hose has a flared end 16 that is utilized in the attachment of the garden hose nozzle to the sprinkler 18.

The sprinkler is made of a pliable plastic material, for example one of the polyethylenes. It has a bottom wall 20, a vertical, cylindrical side wall 22 rising from the circular bottom wall 20, and a dome shaped top 24 extending upwardly and inwardly from the upper perimeter of the cylindrical side wall 22. Concentric rows of orifices 26 are formed in the dome shaped top 24 in order to form a spray when water is applied to the interior of the sprinkler and under a reasonable pressure.

An aperture 30 is formed in the cylindrical, vertical side wall 22 and has a reinforcing bead 32 around the wall 34 thereof. The purpose of the opening or aperture 30 is to accept the garden hose nozzle flared outer end when it is inserted therein. It is inserted by holding it at an angle to the bottom 20 (Figure 2) and slipping it inwardly, the polyethylene flexing and yielding in order to permit the flared end 16 to enter the chamber 36 of the sprinkler 18. Then when the water under pressure is introduced into the chamber 36, the pressure reacts on the surface of the flared end 16 of the nozzle 14 pressing it firmly in seat 38 that is formed around aperture 30. This holds the nozzle and sprinkler 18 assembled rigidly while the water under pressure is applied into the chamber 36. Of course, this water issues through the orifices 26 in order to provide a lawn spray. In order to remove the nozzle the reverse procedure takes place after the water pressure has been reduced, preferably to zero.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a lawn watering assembly which has a hose, a nozzle at one end of said hose, an outwardly flared end on said nozzle, the improvement comprising: the combination with said nozzle of a lawn sprinkler comprising a one-piece flexible plastic body having an essentially flat bottom wall, a cylindrical side wall perpendicular to said bottom wall, a substantially dome-shaped top wall connected to the upper edge of said cylindrical side wall, said cylindrical side wall having an aperture therein in which the flared end of the nozzle is insertable, said side wall being made of flexible material so that it may yield and stretch when the flared end of the nozzle is inserted in said aperture, the material of said side wall around the periphery of said aperture constituting a seat on which a surface of the flared end of said nozzle rests, and the flared end of said nozzle being held firmly pressed against said seat by the force of the water flowing into said sprinkler from the hose and nozzle.

2. The combination of claim 1 wherein said dome-shaped top wall of said sprinkler has a plurality of orifices through which the water under pressure is issued, and a reinforcing bead around said aperture and integrally connected to said side wall of said sprinkler.

References Cited in the file of this patent
UNITED STATES PATENTS

| | | |
|---|---|---|
| 1,628,118 | Coles | May 10, 1927 |
| 1,918,874 | Shannahan | July 18, 1933 |
| 1,962,793 | Vogel | June 12, 1934 |
| 2,261,500 | Lewis | Nov. 4, 1941 |
| 2,520,770 | Manville | Aug. 29, 1950 |